Nov. 10, 1942.   D. A. HAYNES   2,301,398
VEHICLE SPRING SUSPENSION
Filed Jan. 10, 1941   2 Sheets-Sheet 1
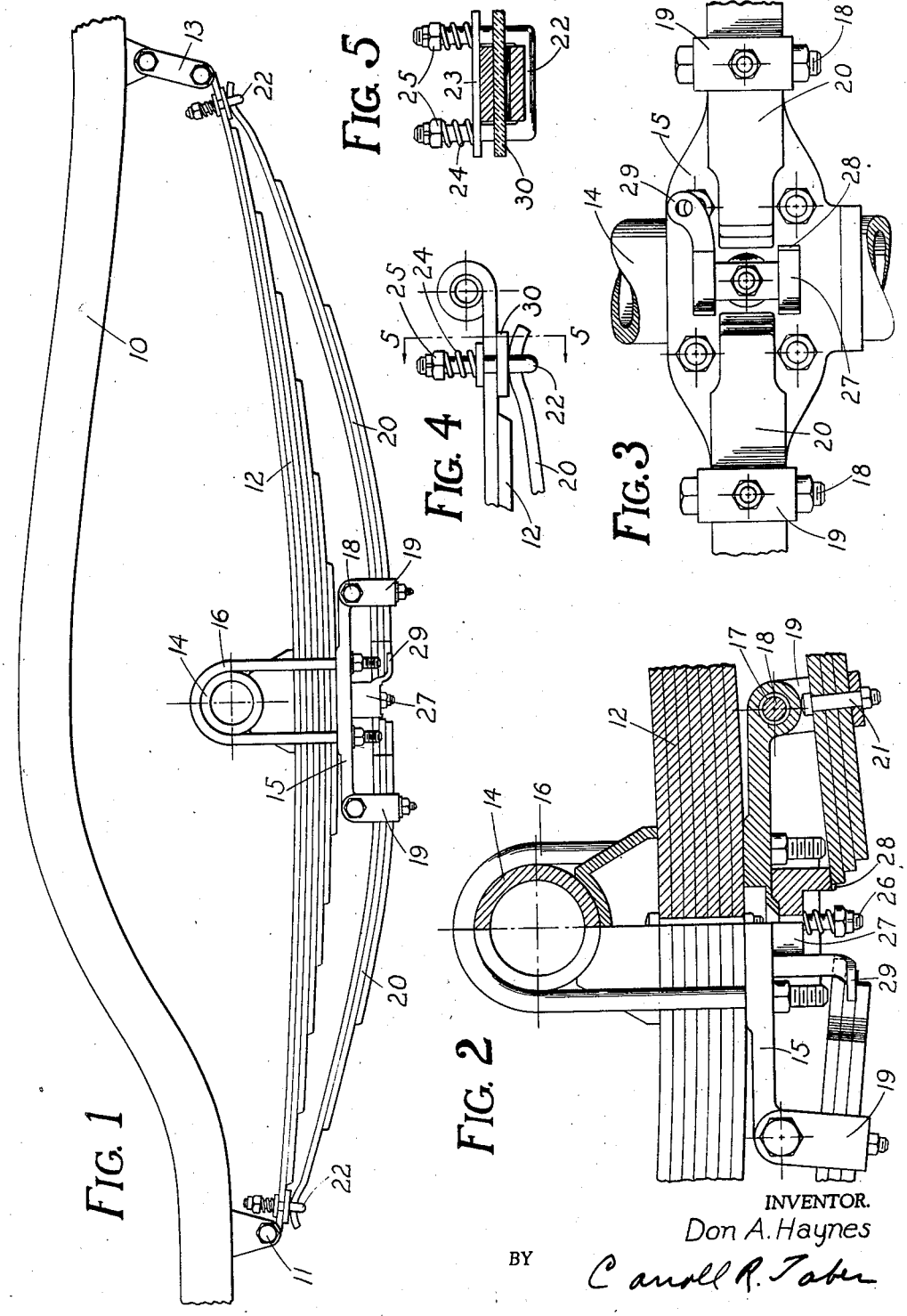
INVENTOR.
Don A. Haynes

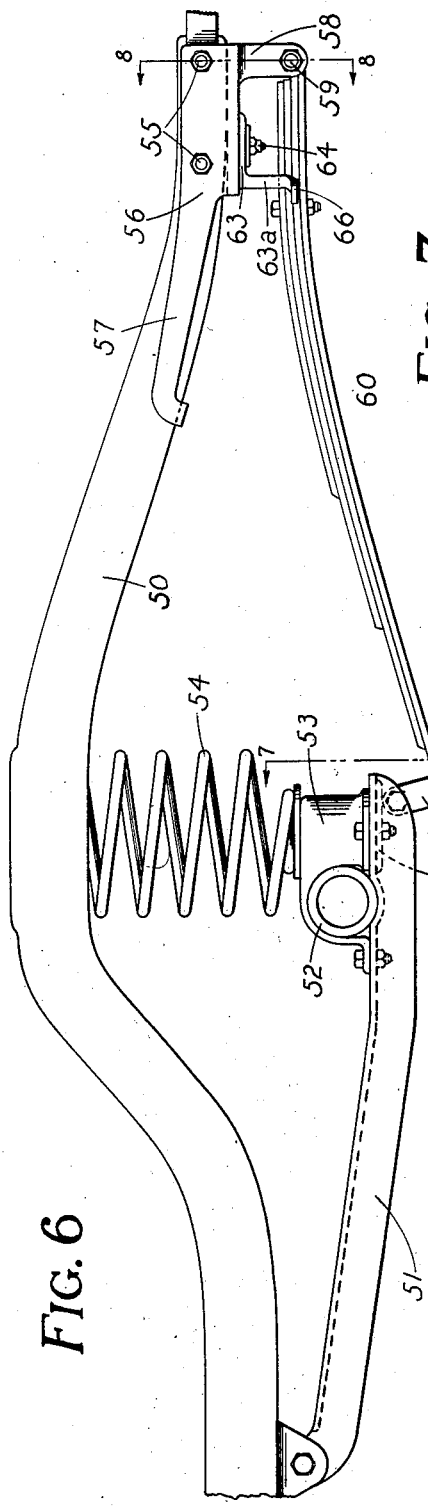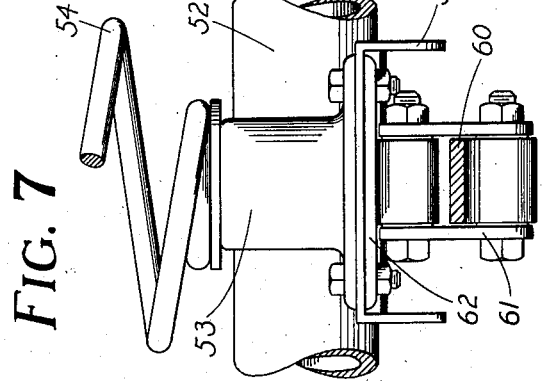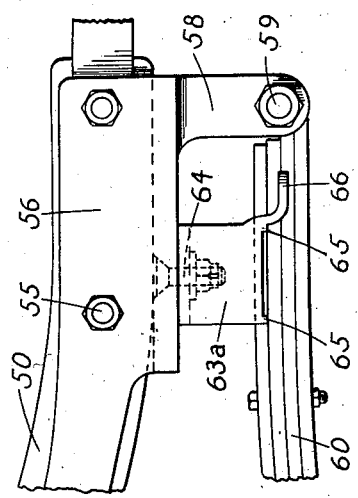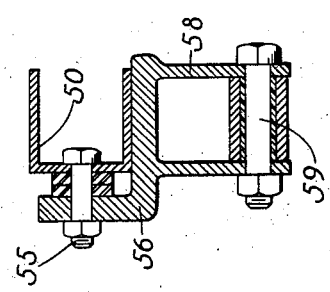

Patented Nov. 10, 1942

2,301,398

UNITED STATES PATENT OFFICE 2,301,398

VEHICLE SPRING SUSPENSION

Don A. Haynes, Lansing, Mich.

Application January 10, 1941, Serial No. 373,862

8 Claims. (Cl. 267—41)

This invention relates to spring suspensions for vehicles, and more particularly to auxiliary or overload springs therefor.

The principal object of the invention is to provide an auxiliary spring for use in connection with a standard vehicle spring suspension, so constructed that it can be put into or out of operation at the will of the operator.

Another object of the invention is to provide an auxiliary spring that can be employed in connection with standard vehicle spring suspensions.

A still further object is to provide an auxiliary spring unit having the necessary fittings to enable it to be readily attached to spring suspensions of existing vehicles.

These objects will more fully appear in the following specification when read in connection with the accompanying drawings, wherein—

Figure 1 is a fragmentary side elevational view of a vehicle spring suspension showing the invention attached thereto with the auxiliary spring in inoperative position;

Figure 2 is a view partly in elevation and partly in section of a portion of the device shown in Figure 1 but showing the parts in operative position;

Figure 3 is a bottom view of a portion of the device shown in Figure 1;

Figure 4 is a fragmentary side elevational view of one end of the spring suspension shown in Figure 1;

Figure 5 is a cross-sectional view taken on substantially the line 5—5 of Figure 4;

Figure 6 is a fragmentary side elevational view of a modified form of the invention;

Figure 7 is a cross-sectional view taken on substantially the line 7—7 of Figure 6;

Figure 8 is a cross-sectional view taken on substantially the line 8—8 of Figure 6; and Figure 9 is an enlarged fragmentary elevational view of a portion of the device shown in Figure 6 showing the auxiliary spring in its inoperative position.

Referring now more in detail to the drawings, and particularly to Figures 1 to 5 thereof, the numeral 10 designates the side frame member of a standard vehicle chassis frame. Pivotally connected at one end to the vehicle frame by bolt 11 is a standard semi-elliptic spring 12. The spring is connected at its rear end to the frame by means of a shackle 13. An axle 14 is mounted on the spring 12 and connected thereto by a plate 15 and a pair of U-bolts 16.

The plate 15 previously mentioned replaces the conventional spring retaining plate found in ordinary spring suspensions. The plate is enlarged at its opposite ends and is provided with a pair of transverse apertures 17 which receive bolts 18. Pivotally connected to the plate 15 by means of the bolts 18 are two U-shaped yokes 19. A quarter-elliptic spring 20 is mounted in each of the yokes 19 and rigidly clamped thereto by bolt 21 extending downwardly through the leaves of the spring 20 and the base of the yoke 19. The ends of the springs 20 adjacent to each other project a substantial distance beyond the yokes 19.

The ends of the springs 20 remote from each other are connected to the semi-elliptic spring 12 adjacent its ends. The connection consists of a U-bolt 22 which is looped around the end of the spring 20 and straddles the spring 12. A plate 23 rests upon the top of the spring 12 and is apertured to receive the ends of the U-bolt 22. A pair of coiled springs 24 surround the ends of the U-bolt 22 and are placed under stress by a pair of nuts 25. Between the leaves of the springs 12 and 20 is a pad 30 of anti-friction material.

Rigidly attached to the center of the plate 15 and extending downwardly therefrom is a pin 26 having a threaded lower end. A block 27 is apertured to receive the pin 26 and is pivotally mounted thereon. The block 27 is substantially H-shaped in plan, as shown in Figure 3, and is provided at each corner with a downwardly projecting lug 28. A lever 29 is rigidly attached to the block 27 and projects downwardly and laterally therefrom. This lever 29 forms a handle to permit turning the block 27 on the pin 26 when desired.

Ordinarily when the vehicle is normally loaded the spring 12 will be sufficient to carry the load on the vehicle. Under such conditions the block 27 will be left in its normal inoperative position between the adjacent ends of springs 20, shown in Figures 1 and 3. Then the springs 20 and yokes 19 will merely rock about the pivots 18. When it is desired to carry more than the normal load on the vehicle the lever 29 is rotated 90° into the position shown in Figure 2, thereby turning the block 27 so that it is interposed between the top surface of the adjacent ends of the springs 20 and the bottom surface of the plate 15. When in that position the lugs 28 engage opposite sides of the springs 20. Block 27 prevents turning movement of the springs 20 about the pivots 18 in a direction toward the plate 15. Springs 20 will then act to carry a portion of the load.

In order to bring the block 27 into operative position it may be necessary to jack up the frame 10 to relieve the springs 12 of load and permit the separation of the inner ends of the springs 20 and the plate 15. The block 27 can then be swung to its operative position and the vehicle frame can be lowered. When the block 27 is in its lowered position the flanges 28 engage the opposite edges of the springs 20 to prevent the block 27 from accidentally rotating from its operative position.

The modification of the invention shown in Figures 6 to 9 is primarily adapted for use with conventional coil springs. The suspension shown in these figures comprises a frame 50 having an arm 51 pivotally attached at one end to the frame. The other end of the arm 51 is rigidly clamped to an axle 52 by means of a combined clamp and spring seat 53. Resting on the spring seat 53 and interposed between it and the frame 50 is a standard coil spring 54.

Rigidly secured to the frame 50 by means of a pair of bolts 55 is an auxiliary spring support 56. The spring support 56 has an arm 57 integral therewith which engages the frame 50 at a point remote from the bolts 55 to give added support. Projecting downwardly from the end of the spring support 56 remote from the arm 57 are two spaced apart arms 58. These arms are apertured to receive a bolt 59. A quarter-elliptic auxiliary leaf spring 60 is pivotally attached to the arms 58 by means of the bolt 59. The other end of the spring 60 is connected to a shackle 61 which in turn is pivotally connected to a plate 62 bolted to the free end of the arm 51.

A block 63 is pivotally connected on a vertical axis by means of a bolt 64 to the auxiliary spring support 56. The block 63 has a down turned flange 63a at one end which is provided with a pair of short spaced apart lugs 65 at opposite edges thereof. The lugs 65 are adapted to engage opposite edges of the spring 60 when the block 64 is in its operative position, see Figure 6. An operating handle 66 is rigidly connected to the block 64 to facilitate turning movement thereof.

As in the case of the previously described device, under ordinary loads the auxiliary spring 60 is inoperative and merely pivots about the bolt 59 as the spring 54 flexes. When the spring 60 is inoperative, the block 64 is turned so that the flange 63a is located at one side of the spring 60, as shown in Figure 9. When it is desired to employ the auxiliary spring 60, the frame 50 is raised to allow the spring 60 to separate from the frame sufficiently to permit the flange 63a to be swung into its operative position shown in Figure 6. When in its operative position the flange 63a is interposed between the spring 60 and the spring support 56 and provides a fulcrum against which the spring 60 operates. Thus, in effect, when the spring 60 is operating it acts as a cantilever which is clamped to the vehicle at its large end.

From the foregoing it will be apparent that this invention provides an auxiliary spring which can be readily attached to the conventional spring suspension of a vehicle to aid in carrying an excessive load on the vehicle. The auxiliary spring can be easily made inoperative whereby when the vehicle is normally loaded the conventional springs function in the usual manner.

The scope of the invention is indicated in the appended claims.

I claim:

1. In a vehicle having a frame member, an axle member, and a spring supporting said frame member on said axle member; the improvement which comprises a normally inoperative auxiliary leaf spring pivotally connected adjacent one end to one of said members for movement in a vertical plane, means connecting the other end of said auxiliary spring to the other of said members, and mechanism for bringing said auxiliary spring into operation to assist said first named spring in supporting said frame, said mechanism comprising means connected to one of said members for swinging movement about a vertical axis between an inoperative position and an operative position wherein it engages said auxiliary spring at a point spaced from said pivotal connection.

2. In a vehicle having a frame member, an axle member, and a spring supporting said frame member on said axle member; the improvement which comprises a normally inoperative auxiliary leaf spring pivotally connected adjacent one end to one of said members for movement in a vertical plane, and mechanism for bringing said auxiliary spring into operation to assist said first named spring in supporting said frame, said mechanism comprising means connected to said last named member and interposed between said auxiliary spring and said last named member for swinging movement about a vertical axis between an inoperative position and an operative position wherein it engages said auxiliary spring at a point spaced from said pivotal connection.

3. In a vehicle having a frame member, an axle member, and a spring supporting said frame member on said axle member; the improvement which comprises a normally inoperative auxiliary leaf spring pivotally connected adjacent one end to one of said members for movement in a vertical plane, and mechanism for bringing said auxiliary spring into operation to assist said first named spring in supporting said frame, said mechanism comprising a block pivotally connected on a vertical axis to said last named member for swinging movement between an inoperative position and an operative position wherein it engages said auxiliary spring at a point spaced from said pivotal connection.

4. In a vehicle having a frame, an axle, and a spring supporting said frame on said axle; the improvement which comprises a pair of normally inoperative auxiliary quarter-elliptic springs connected at their ends remote from each other to said first named spring, means pivotally connecting said auxiliary springs intermediate their ends to said axle, and a block rotatably mounted on a vertical axis on said axle member for swinging movement between an inoperative position and an operative position wherein it is interposed between said axle and the adjacent ends of said auxiliary springs to cause the latter to assist the first named spring in supporting said frame.

5. In a vehicle having a frame, an axle, and a spring supporting said frame on said axle; the improvement which comprises a normally inoperative auxiliary leaf spring connected adjacent one end to said first named spring and pivotally connected intermediate its ends to said axle member for movement in a vertical plane, and mechanism for bringing said auxiliary spring into operation to assist said first named spring in supporting said frame, said mechanism comprising a block rotatably mounted on a vertical axis on said axle for swinging movement between an inoperative position and an operative position wherein it is interposed between said axle and the adjacent end of said auxiliary spring.

6. In a vehicle having a frame, an axle, and a spring supporting said frame on said axle; the improvement which comprises a normally inoperative auxiliary leaf spring connected adjacent one end to said axle and pivotally connected adjacent its other end to said frame for swinging movement in a vertical plane, and mechanism for bringing said auxiliary spring into operation to assist said first named spring in supporting said frame, said mechanism comprising a block rotatably mounted on a vertical axis on said axle for swinging movement between an inoperative position and an operative position wherein it is interposed between said frame and said auxiliary spring.

7. In a vehicle having a frame member, an axle member, and a spring supporting said frame member on said axle member; the improvement which comprises a normally inoperative auxiliary leaf spring pivotally connected adjacent one end to one of said members for movement in a vertical plane, and mechanism for bringing said auxiliary spring into operation to assist said first named spring in supporting said frame, said mechanism comprising a block pivotally connected on a vertical axis to said last named member for swinging movement between an inoperative position and an operative position wherein it engages said auxiliary spring at a point spaced from said pivotal connection, said block having a pair of spaced apart vertical projections thereon adapted to engage opposite vertical sides of said auxiliary spring when said block is in its operative position whereby to prevent rotation of said block.

8. In a vehicle having a frame member, an axle member, and a spring supporting said frame member on said axial member; the improvement which comprises a normally inoperative auxiliary leaf spring pivotally connected adjacent one end to one of said members for movement in a vertical plane, means connecting the other end of said auxiliary spring to the other of said members, and mechanism for bringing said auxiliary spring into operation to assist said first named spring in supporting said frame, said mechanism comprising means connected to one of said members for swinging movement about a vertical axis between an inoperative position spaced horizontally from said auxiliary spring and an operative position wherein said means is interposed between said last named member and said auxiliary spring and engages the latter at a point spaced from said pivotal connection.

DON A. HAYNES.